United States Patent [19]

Okada et al.

[11] 4,111,458
[45] Sep. 5, 1978

[54] SAFETY AIR CUSHION BAG IN AUTOMOTIVE VEHICLES

[75] Inventors: Motohiro Okada; Katsumi Oka, both of Asaka; Kiyoshi Honda, Wako; Kazuo Matsuura, Kamifukuoka, all of Japan

[73] Assignee: Honda Giken Kogyo Kabushiki Kaisha, Japan

[21] Appl. No.: 741,149

[22] Filed: Nov. 11, 1976

[30] Foreign Application Priority Data

Nov. 20, 1975 [JP] Japan .............................. 50/15701[U]
Nov. 20, 1975 [JP] Japan .......................... 50/157502[U]

[51] Int. Cl.² ................................................ B60R 21/08
[52] U.S. Cl. ................................. 280/739; 244/138 R
[58] Field of Search ............... 280/739, 738, 742, 743, 280/728; 244/138 R; 220/372, 371, 370, DIG. 6; 267/113, 118

[56] References Cited

U.S. PATENT DOCUMENTS

| 1,259,047 | 3/1918 | Richardson | 220/372 |
| 2,071,881 | 2/1937 | Krause | 220/372 |
| 3,527,475 | 9/1970 | Carey | 280/739 |
| 3,573,885 | 4/1971 | Brawn | 280/739 |
| 3,733,091 | 5/1973 | Fleck | 280/729 |
| 3,820,814 | 6/1974 | Allgaier | 280/742 |
| 3,937,488 | 2/1976 | Wilson | 280/736 |
| 4,007,759 | 2/1977 | Martin | 220/372 X |

*Primary Examiner*—John P. Silverstrim
*Attorney, Agent, or Firm*—Polster, Polster and Lucchesi

[57] ABSTRACT

An improved safety air cushion bag which is constructed with a main body of the air cushion bag, an air outlet port or hole formed in one part of the air cushion bag main body, a gas-permeable cloth covering the air outlet port, and at least a single reinforcing member for preventing the gas-permeable cover cloth from breakage or bursting at an excessive load being applied to the air cushion bag at the shock of collision, the reinforcing member being attached separately to the air outlet port, or formed integrally with the air cushion bag main body at the part of the air outlet port, in a manner to extend across the air outlet port with both ends thereof being joined to the peripheral edges of the air outlet port in the air cushion bag main body.

3 Claims, 9 Drawing Figures

SAFETY AIR CUSHION BAG IN AUTOMOTIVE VEHICLES

BACKGROUND OF THE INVENTION a. Field of the Invention

This invention relates to a self-inflating air cushion bag. More particularly, it is concerned with a safety air cushion bag or pillow for use in an automobile and like other vehicles, which is inflated by a pressurized gas at the time of collision of the vehicle in traffic accident so as to protect riders or passengers in the vehicle from unexpected danger of the traffic accident.

b. Description of Prior Arts

Owing to remarkable improvement in the running performance of automobiles in conjunction with improved road conditions, the automobiles can be driven as high a speed as ever made possible. With increase in the running speed in such vehicles, however, collision accidents happen not infrequently between automobiles running along the road at such high speed, thereby causing serious injury or tragic death of the vehicle riders or passengers.

In order to avoid such unexpected misery on the part of the vehicle riders, use of a safety seat belt has been prompted, which has now become the essential equipment in most automobiles. However, even the safety seat belt is not still safe enough to protect the vehicle riders from unexpected injury or death due to extremely heavy shock at the collision, particularly, in the case of the automotive vehicles running at a speed as high as 35 miles/hour and above, at which an incredibly heavy shock is potentially applied to the vehicle riders.

Therefore, in addition to the safety seat belt, an air-cushion bag or pillow which is inflated instantaneously at the time of a collision accident being taken place, and which absorbs the great shock imposed on the human body, has been contemplated for use along with the safety seat belt.

For this kind of self-inflating air cushion bag or pillow, there has already been known such one that is provided in one part thereof with the circular air outlet port which serves as an escape from a load imparted to the air cushion bag, after it is inflated, by the weight of the vehicle rider who is leaning frontward due to the moment of inertia at the collision so that he or she may be prevented from bouncing by the restitutive force of the inflated air cushion bag.

In the air cushion bag of the above-described construction, the circular air outlet port is covered with a gas-permeable cloth, the peripheral edge of which is joined to the main body of the air cushion bag by any appropriate expedient such as, for example, stitching, to thereby control the outflowing quantity of air from the inflated air cushion bag in accordance with the load imparted thereto. With this inflated air cushion bag, however, there exists a serious disadvantage such that, since an excessive load is instantaneously imparted to the inflated air cushion bag at the time of collision of the automotive vehicles, it is subjected to deformation with the consequence that the circular air outlet port per se is also deformed from circle to ellipse, and, at the same time, following this deformation of the air outlet port, the gas-permeable cloth is stretched by a large resistance caused by the outflowing air to unavoidably stretch the cloth in the direction of the long (or major) diameter of the above-mentioned elliptically deformed air outlet port, as the result of which the cover cloth is bursted out, or the peripheral edge portion thereof joined to the main body of the air cushion bag is broken to make it difficult to secure a stable air outlet performance. The tearing of the cloth becomes enhanced when knitted fabric having a certain specific directivity in its elongation is used as the gas-permeable cloth material, and the tensile force is applied to the direction where the cloth is rather difficult to stretch.

SUMMARY OF THE INVENTION

In view of the afore-described disadvantage which is inherent in the known type of the self-inflating safety air cushion bag, it is a primary object of the present invention to provide an improved safety air cushion bag which is free from tear of the gas-permeable cloth covering the air outlet port formed in the main body of the air cushion bag, or separation of the joined peripheral edge of the cover cloth from the main body of the air cushion bag due to sudden impact imparted thereto at the shock of collision of the automotive vehicles.

It is another object of the present invention to provide an improved safety air cushion bag for use in automotive vehicles which is capable of absorbing the excessive load applied thereto by the frontwardly leaning vehicle rider at the time of the collision accident by means of a suitable gas-permeable cloth which is reinforced by at least a single band extending across the center part of the circular air outlet port between the opposite peripheral edges thereof, or at least a single bad-shaped reinforcing member integrally formed with the main body of the air cushion bag at the portion of the air outlet port.

According to the present invention, in one aspect thereof, there is provided a safety air cushion bag for use in automotive vehicles, etc., which comprises in combination: (a) a main body of the air cushion bag; (b) at least one air outlet port formed in one part of the main body of the air cushion bag; (c) a gas-permeable cover cloth which is disposed on said air outlet port to close the same; and (d) at least a single strip of reinforcing band which is extended diametrically across the center or its vicinity of said air outlet port, and between the opposing peripheral edges thereof.

According to the present invention, in another aspect thereof, there is provided a safety air cushion bag for use in automotive vehicles, etc., which comprises in combination: (a) a main body of the air cushion bag; (b) at least one air outlet port formed in one part of the main body of the cushion bag; (c) a gas-permeable cover cloth which is disposed on the air outlet port to close the same; and (d) a reinforcing member formed in the main body of the air cushion bag integrally therewith by cutting or incising the main body at the portion of the air outlet port.

The foregoing objects, other objects as well as detailed construction and function of the safety air cushion bag according to the present invention will become more apparent and understandable from the following detailed description thereof, when read in conjunction with the accompanying drawing.

BRIEF DESCRIPTION OF THE ACCOMPANYING DRAWING

DETAILED DESCRIPTION OF PREFERRED EMBODIMENTS

Figure 1:
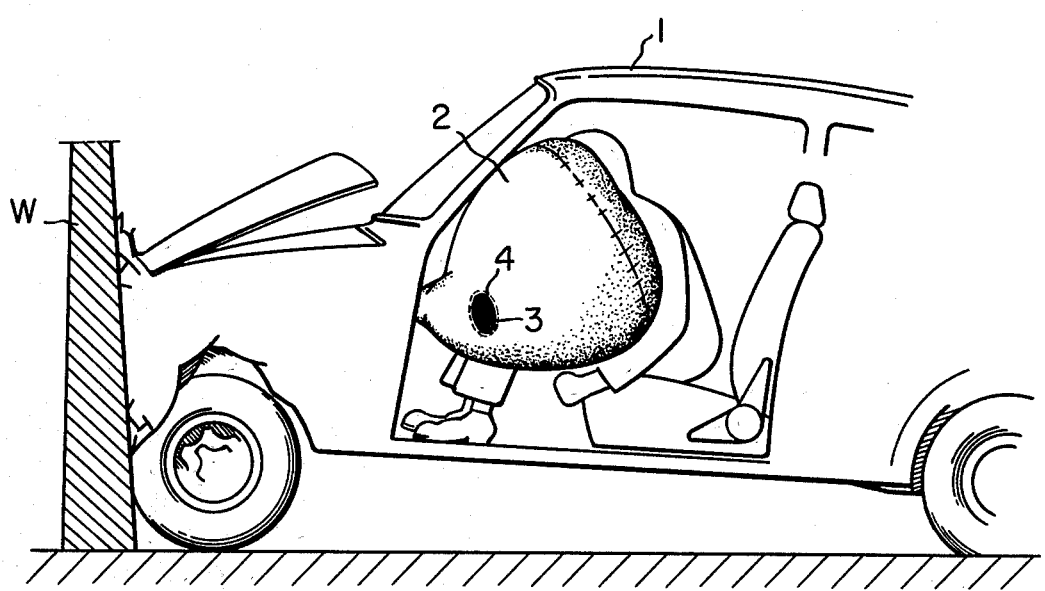
FIG. 1 is a general view showing the safety air cushion bag as inflated, when an automobile collides against a rigid concrete wall.

As shown in FIG. 1, when an automobile 1 collides against an object such as, for example, a rigid concrete wall W, the vehicle rider is thrown out of his seat due to the moment of inertia, at which time the safety air cushion bag becomes instantaneously inflated to receive the vehicle rider who is violently leaning frontward to hit himself against the front panel or front window glass, and to absorbe the excessive load imparted to the cushion bag due to the inertia, thereby protecting him from serious injury.

At this time, if there is provided no air outlet port, or the air outlet port is provided with a cover cloth having no stretchability to the resistance caused to the cover cloth due to the outflowing air from the air cushion bag, when the excessive load is imparted thereto, the vehicle rider is bounced by the restitutive force of the air cushion bag as inflated, or in an extreme case, the cover cloth for the air outlet port is bursted or separated from the main body of the air cushion bag along the joined portion between them by an overriding resistance force, and does not properly function as the cushion or shock absorber.

In order therefore that the gas-permeable cover cloth for the air cushion bag may serve as the escape means for the outflowing air, and yet it is strong enough to withstand such excessive load to be imparted thereto at the time of shock of the collision, the cloth must be reinforced sufficiently.

Figure 2:
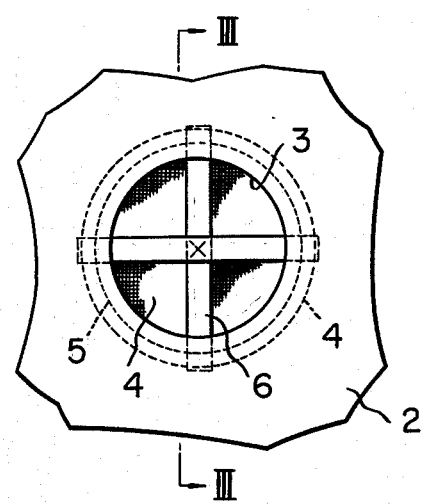
FIG. 2 is a front view of one embodiment of the circular air outlet port for the safety air cushion bag according to the present invention.
Figure 3:
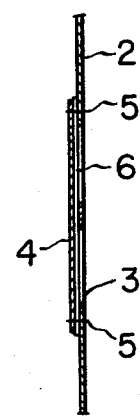
FIG. 3 is a cross-sectional view of the air outlet port shown in FIG. 2, when viewed along the line III—III therein.

For the abovementioned purpose, the embodiment of the air outlet port to be formed at one portion of the safety air cushion bag according to the present invention is designed in such a manner that, as shown in FIGS. 2 and 3, two pieces of a band-shaped reinforcing member 6 made of cloth material are mutually intersected orthogonally passing through the center of the abovementioned air outlet port 3, and the extreme ends of each band-shaped reinforcing member are joined to the edge portion of the main body of the safety air cushion bag 2 and the gas-permeable cloth 4 by means of, for example, stitching. Incidentally, dotted circle lines around the air outlet port designated by a reference numeral 5 denote the stitching or joining lines of the gas-permeable cover cloth to the main body of the safety air cushion bag.

Figure 4:
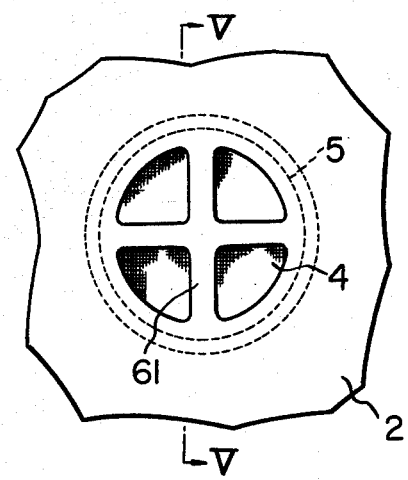
FIG. 4 is a front view showing a second embodiment of the circular air outlet port formed in the safety air cushion bag according to the present invention.
Figure 5:
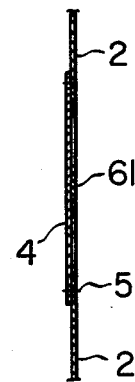
FIG. 5 is a cross-sectional view of the air outlet port shown in FIG. 4, when viewed along the line V—V therein.

Another embodiment of the reinforcing member for the gas-permeable cover cloth to be placed on the air outlet port is as shown in FIGS. 4 and 5, wherein a portion of the main body of the air cushion bag, where the air outlet port is to be provided, is cut out, or incised, at four places, each place being in a sector-shape, so that cross-shaped reinforcing members 61 may remain at this portion after the sector-shaped cuttings.

FIGS. 6 to 9 show the other embodiments according to the present invention, in which cloth material having a specific directivity in its elongation is used as the gas-permeable cloth for covering the air outlet port.

Figure 6:
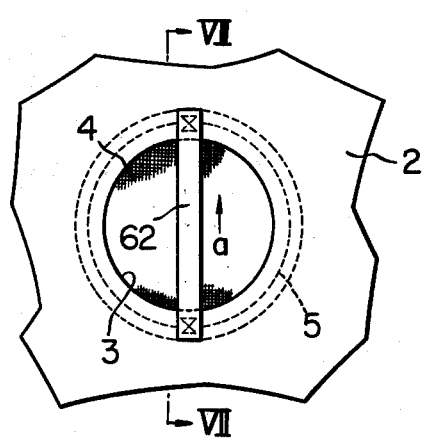
FIG. 6 is a front view showing a third embodiment of the circular air outlet port formed in the safety air cushion bag according to the present invention.
Figure 7:
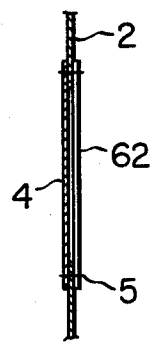
FIG. 7 is a cross-sectional view of the air outlet port shown in FIG. 6, when viewed along the line VII—VII therein.

That is, in the embodiment shown in FIGS. 6 and 7, a single strip of the reinforcing band 62 is extended across the center of the air outlet port 3 in the direction parallel to a direction $a$ of the gas-permeable cover cloth 4, where it is rather difficult to stretch, and both end parts of the reinforcing band are joined to the main body 2 of the air cushion bag and the gas-permeable cover cloth 4 at their edge portions by means of, for example, stitching.

Figure 8:
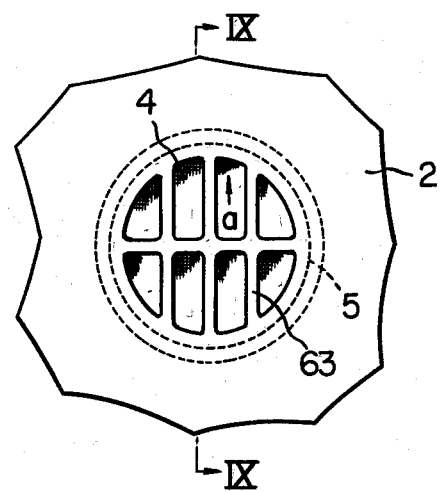
FIG. 8 is a front view showing a fourth embodiment of the circular air outlet port formed in the safety air cushion bag according to the present invention.
Figure 9:
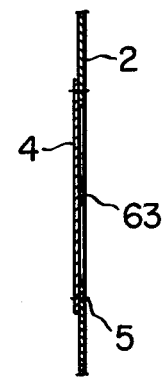
FIG. 9 is a cross-sectional view of the air outlet port shown in FIG. 8, when viewed along the line IX—IX therein.

Further, in the embodiment shown in FIGS. 8 and 9, a portion of the main body 2 of the air cushion bag where the air outlet port is to be formed is cut out to leave a lattice-shaped pattern therein so that this remaining lattice-shaped pattern at the portion of the air outlet port is utilized as the reinforcing member.

As stated in the foregoing, when the reinforcing member in the shape of the cross is provided at the portion of the air outlet port, it is prevented from deforming into an elliptical form irrespective of the specific directivity in elongation of the gas-permeable cover cloth. Accordingly, no forced tension acts on the gas-permeable cloth, so that neither the joined portion between the gas-permeable cover cloth and the main body of the air cushion bag is broken, nor the gas-permeable cover cloth per se is torn. Rather, at the time of the shock of collision, the gas-permeable cloth covering the air outlet port in the air cushion bag is uniformly bulged outward of the air cushion bag by the exhaust air pressure through space gaps defined by the reinforcing bands extending in the vertical and horizontal directions to thereby guarantee favorable gas-outlet performance, and to thereby protect the vehicle riders safely from any unexpected injurious accident.

In addition, when the gas-permeable cover cloth possesses any specific directivity in its elongation, the reinforcing band is extended in parallel with the direction, in which it is rather difficult to stretch, whereby the same effect as mentioned in the foregoing can be obtained.

Although the present invention has been described with reference to a few preferred embodiments thereof, it should be understood that these embodiments are merely illustrative and not so restrictive to the scope of the present invention, and that any change and modification may be made by those persons skilled in this field of art without departing from the spirit and scope of the present invention as set forth in the appended claims.

What is claimed is:

1. A safety air cusion bag for use in automotive vehicles, which comprises in combination:
    (a) a foldable main body of said air cushion bag made of cloth impermeable to gas;

(b) at least one air outlet port formed in one part of said main body of the air cushion bag;

(c) a gas-permeable stretchable cover cloth which stretches with more difficulty in one direction than another, and is disposed on said air outlet port to close the same; and (d) at least a single strip of foldable reinforcing band made of cloth impermeable to gas which is extended diametrically across said air outlet port, and between the opposing peripheral edges thereof, in parallel with the direction of the greatest stretch difficulty of said gas-permeable cover cloth.

2. The safety air cushion bag as set forth in claim 1, in which two strips of said reinforcing band are crossed with respect to said air outlet port.

3. The safety air cushion bag as set forth in claim 2, in which a plurality of strips of said reinforcing band are provided in parallel with the direction of the greatest stretch difficulty of said gas-permeable cover cloth and in one plane.

* * * * *